(12) United States Patent
Isobe

(10) Patent No.: US 7,779,878 B2
(45) Date of Patent: Aug. 24, 2010

(54) PNEUMATIC TIRE

(75) Inventor: Satoru Isobe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 323 days.

(21) Appl. No.: 11/884,907

(22) PCT Filed: Oct. 5, 2006

(86) PCT No.: PCT/JP2006/319991

§ 371 (c)(1),
(2), (4) Date: Aug. 22, 2007

(87) PCT Pub. No.: WO2007/043445

PCT Pub. Date: Apr. 19, 2007

(65) Prior Publication Data

US 2008/0156410 A1  Jul. 3, 2008

(30) Foreign Application Priority Data

Oct. 11, 2005  (JP) .............................. 2005-296481

(51) Int. Cl.
*B60C 9/18* (2006.01)
*B60C 9/22* (2006.01)

(52) U.S. Cl. ...................... 152/526; 152/531; 152/533; 152/535; 152/538

(58) Field of Classification Search ................. 152/526, 152/527, 528, 529, 530, 531, 532, 533, 534, 152/535, 536, 537, 538

See application file for complete search history.

(56) References Cited

U.S. PATENT DOCUMENTS

| 4,183,391 A | 1/1980 | Romand |
| 5,738,740 A | 4/1998 | Cluzel |
| 6,367,527 B1 | 4/2002 | Cluzel |
| 6,598,639 B2 | 7/2003 | Comps et al. |

FOREIGN PATENT DOCUMENTS

| DE | 3327670 | * | 2/1985 |
| FR | 2 770 458 | | 5/1999 |
| FR | 2 857 620 | | 1/2005 |
| JP | 50-132604 | | 10/1975 |
| JP | 63-38007 | * | 2/1988 |
| JP | 64-1604 | * | 1/1989 |
| JP | 1-282004 | * | 11/1989 |
| JP | 2001-512390 | | 8/2001 |
| JP | 2002-539022 | | 11/2002 |

* cited by examiner

*Primary Examiner*—Justin Fischer
(74) *Attorney, Agent, or Firm*—Greer, Burns & Crain, Ltd.

(57) ABSTRACT

In a pneumatic tire, a belt layer includes six superposed belt members. The edge of the fourth belt member on the tire-width direction outer side and the edge of the sixth belt member on the tire-width direction outer side are at approximately the same position in a tire width direction.

17 Claims, 10 Drawing Sheets

FIG.4

| | | INVENTION EXAMPLE 1 | CONVENTIONAL EXAMPLE |
|---|---|---|---|
| HIGH-ANGLE BELT | ANGLE | 60 | SAME AS LEFT |
| | WIDTH | 170 | 355 |
| INNER-SIDE CROSS BELT | ANGLE | 20 | SAME AS LEFT |
| | WIDTH | 365 | SAME AS LEFT |
| OUTER-SIDE CROSS BELT | ANGLE | -20 | SAME AS LEFT |
| | WIDTH | 345 | SAME AS LEFT |
| FIRST CIRCUMFERENTIAL-DIRECTION REINFORCING LAYER | ANGLE | 0 | SAME AS LEFT |
| | WIDTH W1 | 300 | SAME AS LEFT |
| | ARRANGING POSITION | BETWEEN CROSS BELTS | SAME AS LEFT |
| SECOND CIRCUMFERENTIAL-DIRECTION REINFORCING LAYER | ANGLE | 0 | SAME AS LEFT |
| | WIDTH W2 | 65 | 50 |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | ABOVE OUTER-SIDE CROSS BELTS AND ON WIDTH DIRECTION OUTER SIDE WITH RESPECT TO EDGE OF PROTECTION BELT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | 15 |
| PROTECTION BELT | ANGLE | -20 | SAME AS LEFT |
| | WIDTH | 325 | 230 |
| REMAINING BREAKAGE RESISTANCE OF EDGE PORTION OF FIRST CIRCUMFERENTIAL-DIRECTION REINFORCING LAYER | | 100 | 100 |
| REMAINING BREAKAGE RESISTANCE OF EDGE PORTION OF SECOND CIRCUMFERENTIAL-DIRECTION REINFORCING LAYER | | 105 | 100 |
| ANTI-SEPARATION PERFORMANCE | | 103 | 100 |
| REMAINING BREAKAGE RESISTANCE OF CARCASS CENTER PORTION | | 100 | 100 |

FIG.5

| | | INVENTION EXAMPLE 2 | INVENTION EXAMPLE 3 | INVENTION EXAMPLE 4 | COMPARATIVE EXAMPLE 2 | COMPARATIVE EXAMPLE 3 |
|---|---|---|---|---|---|---|
| HIGH-ANGLE BELT | ANGLE | 60 | SAME AS LEFT | SAME AS LEFT | SAME AS LEFT | SAME AS LEFT |
| | WIDTH | 170 | SAME AS LEFT | SAME AS LEFT | SAME AS LEFT | SAME AS LEFT |
| INNER-SIDE CROSS BELT | ANGLE | 10 | 20 | 45 | 5 | 50 |
| | WIDTH | 365 | SAME AS LEFT | SAME AS LEFT | SAME AS LEFT | SAME AS LEFT |
| OUTER-SIDE CROSS BELT | ANGLE | -10 | -20 | -45 | -5 | -50 |
| | WIDTH | 345 | SAME AS LEFT | SAME AS LEFT | SAME AS LEFT | SAME AS LEFT |
| FIRST CIRCUMFERENTIAL-DIRECTION REINFORCING LAYER | ANGLE | 0 | SAME AS LEFT | SAME AS LEFT | SAME AS LEFT | SAME AS LEFT |
| | WIDTH W1 | 300 | SAME AS LEFT | SAME AS LEFT | SAME AS LEFT | SAME AS LEFT |
| | ARRANGING POSITION | BETWEEN CROSS BELTS | SAME AS LEFT | SAME AS LEFT | SAME AS LEFT | SAME AS LEFT |
| SECOND CIRCUMFERENTIAL-DIRECTION REINFORCING LAYER | ANGLE | 0 | SAME AS LEFT | SAME AS LEFT | SAME AS LEFT | SAME AS LEFT |
| | WIDTH W2 | 65 | SAME AS LEFT | SAME AS LEFT | SAME AS LEFT | SAME AS LEFT |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT | SAME AS LEFT | SAME AS LEFT |
| PROTECTION BELT | ANGLE | -20 | SAME AS LEFT | SAME AS LEFT | SAME AS LEFT | SAME AS LEFT |
| | WIDTH | 325 | SAME AS LEFT | SAME AS LEFT | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 100 | 99 | 100 | 98 |
| REMAINING BREAKAGE RESISTANCE OF EDGE PORTION OF SECOND CIRCUMFERENTIAL-DIRECTION REINFORCING LAYER | | 105 | 101 | 103 | 105 | 100 |
| ANTI-SEPARATION PERFORMANCE | | 103 | 100 | 100 | 103 | 97 |
| REMAINING BREAKAGE RESISTANCE OF CARCASS CENTER PORTION | | 99 | 100 | 101 | 94 | 101 |

FIG.6

| | | INVENTION EXAMPLE 5 | INVENTION EXAMPLE 6 | INVENTION EXAMPLE 7 | COMPARATIVE EXAMPLE 4 |
|---|---|---|---|---|---|
| HIGH-ANGLE BELT | ANGLE | 45 | 60 | 90 | 20 |
| | WIDTH | 170 | SAME AS LEFT | SAME AS LEFT | SAME AS LEFT |
| INNER-SIDE CROSS BELT | ANGLE | 20 | SAME AS LEFT | SAME AS LEFT | SAME AS LEFT |
| | WIDTH | 365 | SAME AS LEFT | SAME AS LEFT | SAME AS LEFT |
| OUTER-SIDE CROSS BELT | ANGLE | -20 | SAME AS LEFT | SAME AS LEFT | SAME AS LEFT |
| | WIDTH | 345 | SAME AS LEFT | SAME AS LEFT | SAME AS LEFT |
| FIRST CIRCUMFERENTIAL-DIRECTION REINFORCING LAYER | ANGLE | 0 | SAME AS LEFT | SAME AS LEFT | SAME AS LEFT |
| | WIDTH W1 | 300 | SAME AS LEFT | SAME AS LEFT | SAME AS LEFT |
| | ARRANGING POSITION | BETWEEN CROSS BELTS | SAME AS LEFT | SAME AS LEFT | SAME AS LEFT |
| SECOND CIRCUMFERENTIAL-DIRECTION REINFORCING LAYER | ANGLE | 0 | SAME AS LEFT | SAME AS LEFT | SAME AS LEFT |
| | WIDTH W2 | 65 | SAME AS LEFT | SAME AS LEFT | SAME AS LEFT |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT | SAME AS LEFT |
| PROTECTION BELT | ANGLE | -20 | SAME AS LEFT | SAME AS LEFT | SAME AS LEFT |
| | WIDTH | 325 | SAME AS LEFT | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 100 | 100 | 100 |
| REMAINING BREAKAGE RESISTANCE OF EDGE PORTION OF SECOND CIRCUMFERENTIAL-DIRECTION REINFORCING LAYER | | 105 | 105 | 105 | 105 |
| ANTI-SEPARATION PERFORMANCE | | 103 | 103 | 103 | 103 |
| REMAINING BREAKAGE RESISTANCE OF CARCASS CENTER PORTION | | 99 | 100 | 101 | 96 |

FIG.7

| | | INVENTION EXAMPLE 8 | INVENTION EXAMPLE 9 | INVENTION EXAMPLE 10 |
|---|---|---|---|---|
| HIGH-ANGLE BELT | ANGLE | 60 | SAME AS LEFT | 90 |
| | WIDTH | 170 | SAME AS LEFT | SAME AS LEFT |
| INNER-SIDE CROSS BELT | ANGLE | 20 | SAME AS LEFT | SAME AS LEFT |
| | WIDTH | 365 | SAME AS LEFT | SAME AS LEFT |
| OUTER-SIDE CROSS BELT | ANGLE | -20 | SAME AS LEFT | SAME AS LEFT |
| | WIDTH | 345 | SAME AS LEFT | SAME AS LEFT |
| FIRST CIRCUMFERENTIAL-DIRECTION REINFORCING LAYER | ANGLE | 0 | SAME AS LEFT | SAME AS LEFT |
| | WIDTH W1 | 300 | SAME AS LEFT | SAME AS LEFT |
| | ARRANGING POSITION | BETWEEN CROSS BELTS | BETWEEN OUTER-SIDE CROSS BELT AND PROTECTION BELT | SAME AS LEFT |
| SECOND CIRCUMFERENTIAL-DIRECTION REINFORCING LAYER | ANGLE | 0 | SAME AS LEFT | SAME AS LEFT |
| | WIDTH W2 | 65 | SAME AS LEFT | SAME AS LEFT |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT |
| PROTECTION BELT | ANGLE | -20 | SAME AS LEFT | 20 |
| | WIDTH | 325 | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 100 | 100 |
| REMAINING BREAKAGE RESISTANCE OF EDGE PORTION OF SECOND CIRCUMFERENTIAL-DIRECTION REINFORCING LAYER | | 105 | 105 | 105 |
| ANTI-SEPARATION PERFORMANCE | | 103 | 103 | 104 |
| REMAINING BREAKAGE RESISTANCE OF CARCASS CENTER PORTION | | 100 | 100 | 103 |

FIG.8

| | | INVENTION EXAMPLE 11 | INVENTION EXAMPLE 12 | INVENTION EXAMPLE 13 | COMPARATIVE EXAMPLE 5 |
|---|---|---|---|---|---|
| HIGH-ANGLE BELT | ANGLE | 60 | SAME AS LEFT | SAME AS LEFT | SAME AS LEFT |
| | WIDTH | 170 | SAME AS LEFT | SAME AS LEFT | SAME AS LEFT |
| INNER-SIDE CROSS BELT | ANGLE | 20 | SAME AS LEFT | SAME AS LEFT | SAME AS LEFT |
| | WIDTH | 365 | SAME AS LEFT | SAME AS LEFT | SAME AS LEFT |
| OUTER-SIDE CROSS BELT | ANGLE | -20 | SAME AS LEFT | SAME AS LEFT | SAME AS LEFT |
| | WIDTH | 345 | SAME AS LEFT | SAME AS LEFT | SAME AS LEFT |
| FIRST CIRCUMFERENTIAL-DIRECTION REINFORCING LAYER | ANGLE | 0 | SAME AS LEFT | SAME AS LEFT | SAME AS LEFT |
| | WIDTH W1 | 300 | SAME AS LEFT | SAME AS LEFT | SAME AS LEFT |
| | ARRANGING POSITION | BETWEEN CROSS BELTS | SAME AS LEFT | SAME AS LEFT | SAME AS LEFT |
| SECOND CIRCUMFERENTIAL-DIRECTION REINFORCING LAYER | ANGLE | 0 | SAME AS LEFT | SAME AS LEFT | SAME AS LEFT |
| | WIDTH W2 | 65 | 60 | 70 | 80 |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | -5 | 5 | 15 |
| PROTECTION BELT | ANGLE | -20 | SAME AS LEFT | SAME AS LEFT | SAME AS LEFT |
| | WIDTH | 325 | SAME AS LEFT | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 99 | 100 | 100 |
| REMAINING BREAKAGE RESISTANCE OF EDGE PORTION OF SECOND CIRCUMFERENTIAL-DIRECTION REINFORCING LAYER | | 105 | 105 | 104 | 100 |
| ANTI-SEPARATION PERFORMANCE | | 103 | 103 | 103 | 103 |
| REMAINING BREAKAGE RESISTANCE OF CARCASS CENTER PORTION | | 100 | 100 | 100 | 100 |

FIG.9

| | | INVENTION EXAMPLE 14 | INVENTION EXAMPLE 15 | INVENTION EXAMPLE 16 | COMPARATIVE EXAMPLE 6 |
|---|---|---|---|---|---|
| HIGH-ANGLE BELT | ANGLE | 60 | SAME AS LEFT | SAME AS LEFT | SAME AS LEFT |
| | WIDTH | 170 | SAME AS LEFT | SAME AS LEFT | SAME AS LEFT |
| INNER-SIDE CROSS BELT | ANGLE | 20 | SAME AS LEFT | SAME AS LEFT | SAME AS LEFT |
| | WIDTH | 365 | SAME AS LEFT | SAME AS LEFT | SAME AS LEFT |
| OUTER-SIDE CROSS BELT | ANGLE | -20 | SAME AS LEFT | SAME AS LEFT | SAME AS LEFT |
| | WIDTH | 345 | SAME AS LEFT | SAME AS LEFT | SAME AS LEFT |
| FIRST CIRCUMFERENTIAL-DIRECTION REINFORCING LAYER | ANGLE | 0 | SAME AS LEFT | SAME AS LEFT | SAME AS LEFT |
| | WIDTH W1 | 300 | SAME AS LEFT | SAME AS LEFT | SAME AS LEFT |
| | ARRANGING POSITION | BETWEEN CROSS BELTS | SAME AS LEFT | SAME AS LEFT | SAME AS LEFT |
| SECOND CIRCUMFERENTIAL-DIRECTION REINFORCING LAYER | ANGLE | 0 | 5 | 20 | 45 |
| | WIDTH W2 | 65 | SAME AS LEFT | SAME AS LEFT | SAME AS LEFT |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT | SAME AS LEFT |
| PROTECTION BELT | ANGLE | -20 | SAME AS LEFT | SAME AS LEFT | SAME AS LEFT |
| | WIDTH | 325 | SAME AS LEFT | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 100 | 99 | 97 |
| REMAINING BREAKAGE RESISTANCE OF EDGE PORTION OF SECOND CIRCUMFERENTIAL-DIRECTION REINFORCING LAYER | | 105 | 106 | 107 | 107 |
| ANTI-SEPARATION PERFORMANCE | | 103 | 103 | 103 | 102 |
| REMAINING BREAKAGE RESISTANCE OF CARCASS CENTER PORTION | | 100 | 100 | 100 | 100 |

FIG. 10

| | | INVENTION EXAMPLE 17 | INVENTION EXAMPLE 18 | INVENTION EXAMPLE 19 |
|---|---|---|---|---|
| HIGH-ANGLE BELT | ANGLE | 60 | SAME AS LEFT | SAME AS LEFT |
| | WIDTH | 170 | 95 | 190 |
| INNER-SIDE CROSS BELT | ANGLE | 20 | SAME AS LEFT | SAME AS LEFT |
| | WIDTH | 365 | SAME AS LEFT | SAME AS LEFT |
| OUTER-SIDE CROSS BELT | ANGLE | -20 | SAME AS LEFT | SAME AS LEFT |
| | WIDTH | 345 | SAME AS LEFT | SAME AS LEFT |
| FIRST CIRCUMFERENTIAL-DIRECTION REINFORCING LAYER | ANGLE | 0 | SAME AS LEFT | SAME AS LEFT |
| | WIDTH W1 | 300 | 255 | 320 |
| | ARRANGING POSITION | BETWEEN CROSS BELTS | SAME AS LEFT | SAME AS LEFT |
| SECOND CIRCUMFERENTIAL-DIRECTION REINFORCING LAYER | ANGLE | 0 | SAME AS LEFT | SAME AS LEFT |
| | WIDTH W2 | 65 | SAME AS LEFT | SAME AS LEFT |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT |
| PROTECTION BELT | ANGLE | -20 | SAME AS LEFT | SAME AS LEFT |
| | WIDTH | 325 | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 100 | 99 |
| REMAINING BREAKAGE RESISTANCE OF EDGE PORTION OF SECOND CIRCUMFERENTIAL-DIRECTION REINFORCING LAYER | | 105 | 105 | 104 |
| ANTI-SEPARATION PERFORMANCE | | 103 | 103 | 103 |
| REMAINING BREAKAGE RESISTANCE OF CARCASS CENTER PORTION | | 100 | 99 | 100 |

FIG.11

| | | INVENTION EXAMPLE 20 | INVENTION EXAMPLE 21 | INVENTION EXAMPLE 22 |
|---|---|---|---|---|
| HIGH-ANGLE BELT | ANGLE | 60 | SAME AS LEFT | SAME AS LEFT |
| | WIDTH | 170 | 210 | 130 |
| INNER-SIDE CROSS BELT | ANGLE | 20 | SAME AS LEFT | SAME AS LEFT |
| | WIDTH | 365 | SAME AS LEFT | SAME AS LEFT |
| OUTER-SIDE CROSS BELT | ANGLE | -20 | SAME AS LEFT | SAME AS LEFT |
| | WIDTH | 345 | SAME AS LEFT | SAME AS LEFT |
| FIRST CIRCUMFERENTIAL-DIRECTION REINFORCING LAYER | ANGLE | 0 | SAME AS LEFT | SAME AS LEFT |
| | WIDTH W1 | 300 | SAME AS LEFT | SAME AS LEFT |
| | ARRANGING POSITION | BETWEEN CROSS BELTS | SAME AS LEFT | SAME AS LEFT |
| SECOND CIRCUMFERENTIAL-DIRECTION REINFORCING LAYER | ANGLE | 0 | SAME AS LEFT | SAME AS LEFT |
| | WIDTH W2 | 65 | 45 | 85 |
| | ARRANGING POSITION | BETWEEN CARCASS AND INNER-SIDE CROSS BELT AND ON WIDTH DIRECTION OUTER SIDE WITH RESPECT TO EDGE OF HIGH ANGLE BELT | SAME AS LEFT | SAME AS LEFT |
| DISTANCE BETWEEN EDGE OF FIRST CIRCUMFERENTIAL-DIRECTION REINFORCING LAYER AND EDGE OF SECOND CIRCUMFERENTIAL-DIRECTION REINFORCING LAYER | | 0 | SAME AS LEFT | SAME AS LEFT |
| PROTECTION BELT | ANGLE | -20 | SAME AS LEFT | SAME AS LEFT |
| | WIDTH | 325 | SAME AS LEFT | SAME AS LEFT |
| REMAINING BREAKAGE RESISTANCE OF EDGE PORTION OF FIRST CIRCUMFERENTIAL-DIRECTION REINFORCING LAYER | | 100 | 99 | 100 |
| REMAINING BREAKAGE RESISTANCE OF EDGE PORTION OF SECOND CIRCUMFERENTIAL-DIRECTION REINFORCING LAYER | | 105 | 104 | 105 |
| ANTI-SEPARATION PERFORMANCE | | 103 | 103 | 103 |
| REMAINING BREAKAGE RESISTANCE OF CARCASS CENTER PORTION | | 100 | 100 | 99 |

PNEUMATIC TIRE

TECHNICAL FIELD

The present invention relates to a pneumatic tire. The present invention relates more specifically to a pneumatic tire having a suppressed radial growth during application of a load due to internal pressure in addition to improved anti-belt-edge-separation performance.

BACKGROUND ART

In a tire for trucks or busses with an aspect ratio of 60% or smaller, a large load is applied to the belt layer of the tire due to internal pressure. Accordingly, a fastening effect with which the tire radial growth is suppressed decreases, and thus, deformation increases. As a result, separation tends to occur easily. For this reason, there is need to improve anti-belt-edge-separation performance and suppress tire radial growth of the tires for trucks or busses.

A conventional pneumatic tire that satisfies the above need is disclosed in Patent Document 1. The conventional pneumatic tire P includes a radial carcass reinforcement, on which a crown reinforcing member is placed. The crown reinforcing member includes at least two working crown plies. Plies of each of the working plies are crossed from one ply to the next and form an angle (($\alpha$ or $\beta$) to the circumferential direction. The working crown plies have the widths L32 and L34 each being at least equal to 8.0% of the maximum axial-direction width S0 of the carcass reinforcement. Firstly, an axial-direction continuous ply is arranged between the working ply and the carcass reinforcement closest to the axis of rotation. The axial-direction continuous ply is formed of inextensible metal cables forming an angle of at least $\delta$ of 60° to the circumferential direction, and has the axial-direction width L31 at least equal to the axial-direction widths L32 and L34 of the shortest working crown plies. Secondly, a first additional ply is arranged between the two working crown plies. The first additional ply is formed of metallic elements oriented substantially parallel to the circumferential direction, and has an axial-direction width L33 at least equal to 0.7S0 and a tensile elastic modulus at most equal to that of the most extensible working ply. In the conventional pneumatic tire P, a second additional ply is arranged on each of the two edges of the tire P on a radial-direction outer side with respect to the outermost working crown ply so as to cover the a corresponding one of the edges of the first additional ply arranged between the two working plies. Each of the second additional plies is formed of metallic elements oriented substantially parallel to the circumferential direction, and has a small axial-direction width L36.

Patent Document: Japanese Patent Application Laid-open No. 2001-512390

DISCLOSURE OF INVENTION

Problem to be Solved by the Invention

It is an object of the present invention to provide a pneumatic tire having a suppressed radial growth during application of a load due to internal pressure in addition to improved anti-belt-edge-separation performance.

Means for Solving Problem

To achieve the above object, according to an aspect of the present invention, a pneumatic tire including a carcass layer that extends across a pair of left and right bead cores in a toroidal shape, and a belt layer that is arranged on a tire-radial direction outer side with respect to the carcass layer, wherein the belt layer includes a plurality of belt members that are superposed, the belt members including a high-angle belt that is arranged on the tire-radial direction outer side with respect to the carcass layer, a cord member of the high-angle belt having a fiber direction oblique to a tire circumferential direction at an angle not smaller than 45 degrees and not larger than 90 degrees, a pair of cross belts that is arranged on the tire-radial direction outer side with respect to the high-angle belt, a cord member of each of the cross belts having a fiber direction oblique to the tire circumferential direction at an angle not smaller than 10 degrees and not larger than 45 degrees, and the fiber direction of one of the cord members being different from that of other, a first circumferential-direction reinforcing layer that is arranged between the cross belts, and that has two edges on a tire-width direction inner side with respect to two edges of the cross belt on a tire-radial direction inner side and two edges of the cross belt on the tire-radial direction outer side, and a second circumferential-direction reinforcing layer that is arranged between the carcass layer and the cross belt on the tire-radial direction inner side, and an edge of the first circumferential-direction reinforcing layer on a tire-width direction outer side and an edge of the second circumferential-direction reinforcing layer on the tire-width direction outer side are at approximately in same position in a tire width direction.

In the pneumatic tire, (1) the belt layer is reinforced by the first circumferential-direction reinforcing layer and the second circumferential-direction reinforcing layer. Such reinforcement leads to an advantage that the anti-wear-breakage performance of the circumferential-direction reinforcing layers improves compared to the case where the belt layer is reinforced by only the first circumferential-direction reinforcing layer. (2) The second circumferential-direction reinforcing layer is arranged so as to be interposed between the carcass layer and the inner-side cross belt (the cross belt positioned on the tire-radial direction inner side). Such arrangement reduces the movement of the second circumferential-direction reinforcing layer in the tire width direction during contact of the tire with the road surface, compared to the structure (see Patent Document 1) in which the second circumferential-direction reinforcing layer is the outermost layer of the belt layer (the outermost layer in the tire radial direction). Accordingly, the separation near the second circumferential-direction reinforcing layer is reduced. This leads to an advantage that the anti-belt-edge separation performance of the tire improves. Especially, (3) the edge of the first circumferential-direction reinforcing layer on the tire-width direction outer side and the edge of the second circumferential-direction reinforcing layer on the tire-width direction outer side are at approximately in the same position in the tire width direction (for example, the edge of the first circumferential-direction reinforcing layer is in a position from the edge of the second circumferential-direction reinforcing layer within a range smaller than 10 mm). Accordingly, a traction applied to the edge of the first circumferential-direction reinforcing layer during the contact of the tire with the road surface is dispersed because of the second circumferential-direction reinforcing layer. Such dispersion of traction effectively suppresses wear and breakage of the edge of the first circumferential-direction reinforcing layer, thereby leading to an advantage that the anti-wear-breakage performance of the first circumferential-direction reinforcing layer improves. (4) Because the first circumferential-direction reinforcing layer is arranged so as to be interposed between the cross belts, the movement of the first circumferential-direction reinforcing layer is constrained during the contact of the tire with the road surface. Such constraint of movement suppresses the separation near the first circumferential-direction reinforcing layer, thereby leading to an advantage that the anti-belt-edge-separation performance of the tire further improves.

Moreover, according to another aspect of the present invention, a pneumatic tire including a carcass layer that extends across a pair of left and right bead cores in a toroidal shape, and a belt layer that is arranged on a tire-radial direction outer side with respect to the carcass layer, wherein the belt layer includes a plurality of belt members that are superposed, the belt members including a high-angle belt that is arranged on the tire-radial direction outer side with respect to the carcass layer, a cord member of the high-angle belt having a fiber direction oblique to a tire circumferential direction at an angle not smaller than 45 degrees and not larger than 90 degrees, a pair of cross belts that is arranged on the tire-radial direction outer side with respect to the high-angle belt, a cord member of each of the cross belts having a fiber direction oblique to the tire circumferential direction at an angle not smaller than 10 degrees and not larger than 45 degrees, and the fiber direction of one of the cord members being different from that of other, a first circumferential-direction reinforcing layer that is arranged on the tire-radial direction outer side with respect to the cross belts, and that has two edges on a tire-width direction inner side with respect to two edges of the cross belt on a tire-radial direction inner side and two edges of the cross belt on the tire-radial direction outer side, a protection belt that is arranged on the tire-radial direction outer side with respect to the first circumferential-direction reinforcing layer, and a second circumferential-direction reinforcing layer that is arranged between the carcass layer and the cross belt on the tire-radial direction inner side, and an edge of the first circumferential-direction reinforcing layer on a tire-width direction outer side and an edge of the second circumferential-direction reinforcing layer on the tire-width direction outer side are at approximately in same position in a tire width direction.

In the pneumatic tire, the first circumferential-direction reinforcing layer is arranged so as to be interposed between the outer-side cross belt and the protection belt. With this structure, the above functions and effects of (1) to (3) are obtained as well. In addition, when the tire is in contact with the road surface, the movement of the first circumferential-direction reinforcing layer is constrained because of the protection belt. Hence, the separation near the first circumferential-direction reinforcing layer is suppressed. Such suppression of separation leads to an advantage that the anti-belt-edge-separation performance of the tire improves.

Furthermore, according to still another aspect of the present invention, the cord member of the protection belt has the fiber direction oblique to a direction different from a direction in which the fiber direction of the cord member of the cross belt on the tire-radial direction outer side is oblique.

In the pneumatic tire, the movement of the first circumferential-direction reinforcing layer in the tire width direction is effectively reduced because of the protection belt. Accordingly, the separation near the first circumferential-direction reinforcing layer is suppressed. Such suppression of separation leads to an advantage that the anti-belt-edge-separation performance of the tire improves.

Moreover, according to still another aspect of the present invention, each of the cord members of the cross belts has the fiber direction oblique to the tire circumferential direction at an angle of 25 degrees or smaller.

In the pneumatic tire, the angle is made appropriate, at which the fiber direction of the cord member of each of the cross belts is oblique to the tire circumferential direction. The appropriate angle leads to an advantage that tire radial growth is effectively suppressed during application of a load due to internal pressure.

Furthermore, according to still another aspect of the present invention, the cord member of the high-angle belt has the fiber direction oblique to the tire circumferential direction at an angle of 60 degrees or larger.

In the pneumatic tire, the angle is made appropriate, at which the fiber direction of the cord member of the high-angle belt is oblique to the tire circumferential direction. Especially, when the fiber direction of the cord member of the high-angle belt is oblique to the tire circumferential direction at a small angle (for example, 25 degrees or smaller), the anti-wear-breakage performance or shock resistance of the carcass layer may deteriorate because the rigidity to the tire circumferential direction in the tire cross-sectional direction is low. For this reason, the high-angle belt having the above structure leads to an advantage that the wear and breakage of the carcass layer, or the like, are suppressed.

Moreover, according to still another aspect of the present invention, the edges of the second circumferential-direction reinforcing layer on the tire-width direction outer side and the edges of the first circumferential-direction reinforcing layer in the tire-width direction outer side are positioned such that the edge of the first circumferential-direction reinforcing layer is in a position from the edge of the second circumferential-direction reinforcing layer within a range smaller than 10 millimeter in the tire width direction.

In the pneumatic tire, the traction applied to the edge of the first circumferential-direction reinforcing layer is effectively dispersed during the contact of the tire with the road surface. Such dispersion of traction leads to an advantage that the anti-wear-breakage performance of the first circumferential-direction reinforcing layer more effectively improves.

Furthermore, according to still another aspect of the present invention, the cord member of the first circumferential-direction reinforcing layer has the fiber direction oblique to the tire circumferential direction at an angle of 5 degrees or smaller, and the cord member of the second circumferential-direction reinforcing layer has the fiber direction oblique to the tire circumferential direction at an angle of 20 degrees or smaller.

In the pneumatic tire are made appropriate the angle, at which the fiber angle of the cord member of the first circumferential-direction reinforcing layer is oblique to the tire circumferential direction, and the angle, at which the fiber angle of the cord member of the second circumferential-direction reinforcing layer is oblique to the tire circumferential direction. Hence, the fastening effect from the circumferential-direction reinforcing layers is enhanced. Such enhancement of a fastening effect leads to an advantage that the tire radial growth is effectively suppressed.

Moreover, according to still another aspect of the present invention, a cross-sectional width W of the carcass layer and a cross-sectional width W1 of the first circumferential-direction reinforcing layer in a cross section of the pneumatic tires in a tire meridian direction satisfy $0.60 \leq W1/W \leq 0.75$.

In the pneumatic tire, the ratio W1/W between the cross-sectional width W of the carcass layer and the cross-sectional width W1 of the first circumferential-direction reinforcing layer is made appropriate. The above appropriate ratio leads to an advantage that the tire radial growth is effectively suppressed.

Furthermore, according to still another aspect of the present invention, a cross-sectional width W of the carcass layer and a cross-sectional width W2 of the second circumferential-direction reinforcing layer in the cross section of the pneumatic tires in the tire meridian direction satisfy $0.10 \leq W2/W \leq 0.20$.

In the pneumatic tire, the ratio W2/W between the cross sectional width W of the carcass layer and the cross-sectional width W2 of the second circumferential-direction reinforcing layer is made appropriate. Hence, the traction applied to the edge of the first circumferential-direction reinforcing layer is effectively dispersed during the contact of the tire with the road surface because of the second circumferential-direction reinforcing layer. Such dispersion of traction leads to an advantage that the anti-wear-breakage performance of the first circumferential-direction reinforcing layer improves more effectively.

Moreover, according to still another aspect of the present invention, the pneumatic tire is applied to a heavy-duty pneumatic tire having a tire aspect ratio of 60% or smaller.

The heavy-duty pneumatic tire having the above aspect ratio has a high load rate of belt internal pressure. For this reason, the application of the above pneumatic tire to the heavy-duty pneumatic tire leads to an advantage that the effects are obtained more significantly.

EFFECT OF THE INVENTION

According to the pneumatic tire of the present invention, (1) the belt layer is reinforced by the first circumferential-direction reinforcing layer and the second circumferential-direction reinforcing layer. Such reinforcement leads to an advantage that the anti-wear-breakage performance of the circumferential-direction reinforcing layers improves compared to the case where the belt layer is reinforced by only the first circumferential-direction reinforcing layer. (2) The second circumferential-direction reinforcing layer is arranged so as to be interposed between the carcass layer and the inner-side cross belt (the cross belt positioned on the tire-radial direction inner side). Such arrangement reduces the movement of the second circumferential-direction reinforcing layer in the tire width direction during contact of the tire with the road surface, compared to the structure (see Patent Document 1) in which the second circumferential-direction reinforcing layer is the outermost layer of the belt layer (the outermost layer in the tire radial direction). Accordingly, the separation near the second circumferential-direction reinforcing layer is reduced. This leads to an advantage that the anti-belt-edge separation performance of the tire improves. Especially, (3) the edge of the first circumferential-direction reinforcing layer on the tire-width direction outer side and the edge of the second circumferential-direction reinforcing layer on the tire-width direction outer side are at approximately in the same position in the tire width direction (for example, the edge of the first circumferential-direction reinforcing layer is in a position from the edge of the second circumferential-direction reinforcing layer within a range smaller than 10 mm). Accordingly, a traction applied to the edge of the first circumferential-direction reinforcing layer during the contact of the tire with the road surface is dispersed because of the second circumferential-direction reinforcing layer. Such dispersion of traction effectively suppresses wear and breakage of the edge of the first circumferential-direction reinforcing layer, thereby leading to an advantage that the anti-wear-breakage performance of the first circumferential-direction reinforcing layer improves. (4) Because the first circumferential-direction reinforcing layer is arranged so as to be interposed between the cross belts, the movement of the first circumferential-direction reinforcing layer is constrained during the contact of the tire with the road surface. Such constraint of movement suppresses the separation near the first circumferential-direction reinforcing layer, thereby leading to an advantage that the anti-belt-edge-separation performance of the tire further improves.

BRIEF DESCRIPTION OF DRAWINGS

FIG. 4 is a table containing results of performance tests of pneumatic tires.

FIG. 5 is a table containing results of performance tests of pneumatic tires.

FIG. 6 is a table containing results of performance tests of pneumatic tires.

FIG. 7 is a table containing results of performance tests of pneumatic tires.

FIG. 8 is a table containing results of performance tests of pneumatic tires.

FIG. 9 is a table containing results of performance tests of pneumatic tires.

FIG. 10 is a table containing results of performance tests of pneumatic tires.

FIG. 11 is a table containing results of performance, tests of pneumatic tires.

EXPLANATIONS OF LETTERS OR NUMERALS

Figure 1:
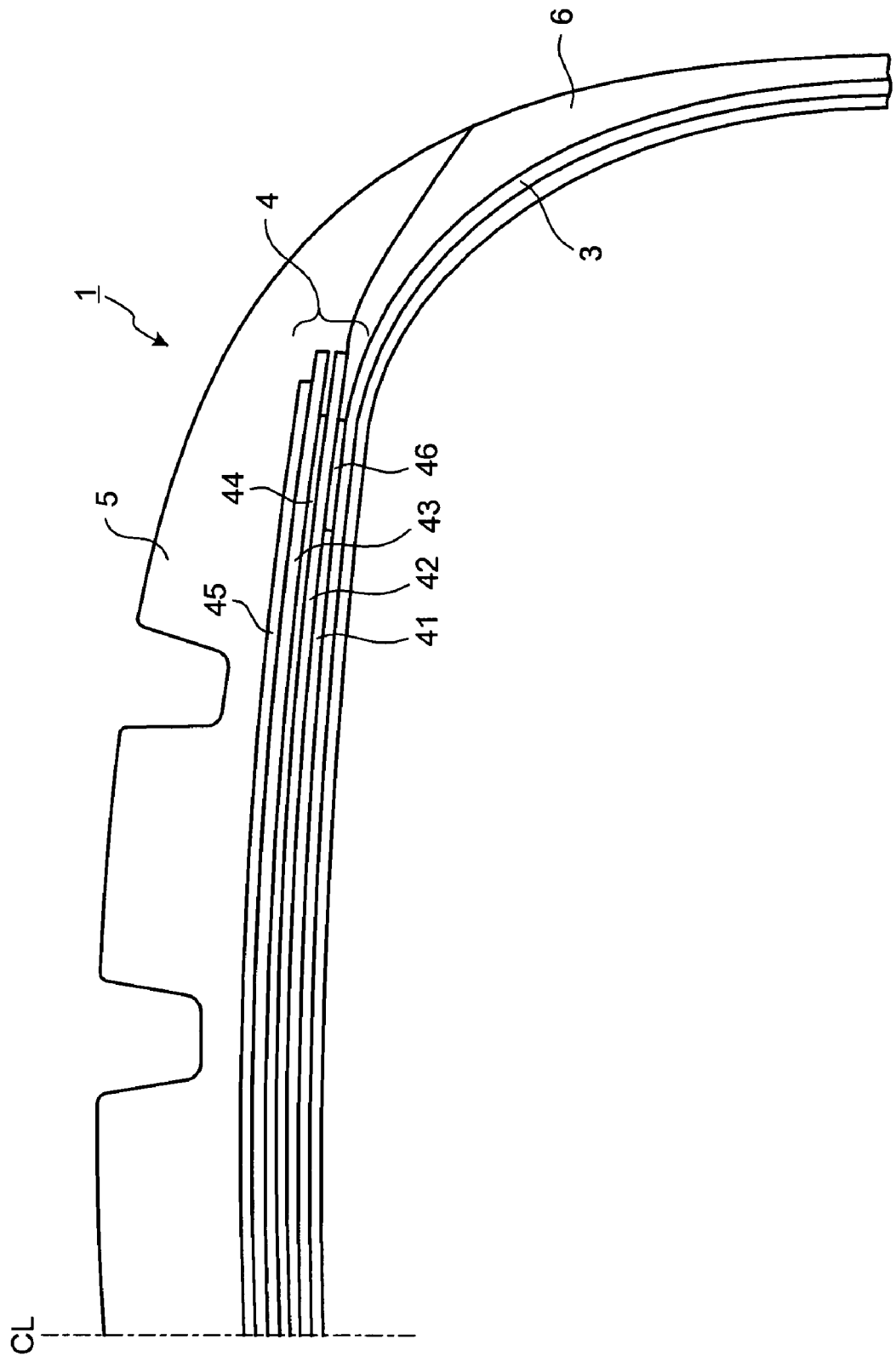
FIG. 1 is a cross section of a pneumatic tire in a tire meridian direction according to an embodiment of the present invention.

1 Pneumatic tire
3 Carcass layer
4 Belt layer
5 Tread rubber
6 Sidewall rubber
41 High-angle belt
42 Inner-side cross belt
43 Outer-side cross belt
44 First circumferential-direction reinforcing layer
45 Protection belt
46 Second circumferential-direction reinforcing layer

BEST MODE(S) FOR CARRYING OUT THE INVENTION

The present invention is explained in detail below with reference to the accompanying drawings. The embodiments of the present invention explained below do not limit the present invention. The constituents of the embodiment include constituents that can be easily replaced by those skilled in the art and constituents substantially same as the constituents of the embodiment. The modified examples disclosed below can be arbitrarily combined within the scope obvious to those skilled in the art.

Embodiment

Figure 2:
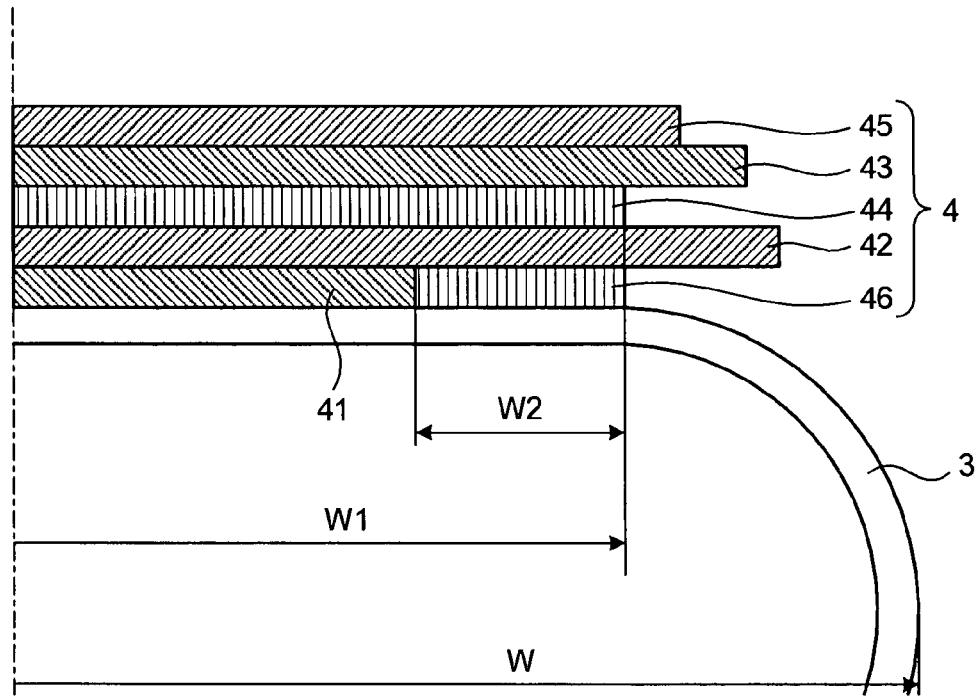
FIG. 2 is an explanatory view of a belt structure of the pneumatic tire shown in FIG. 1.
Figure 3:
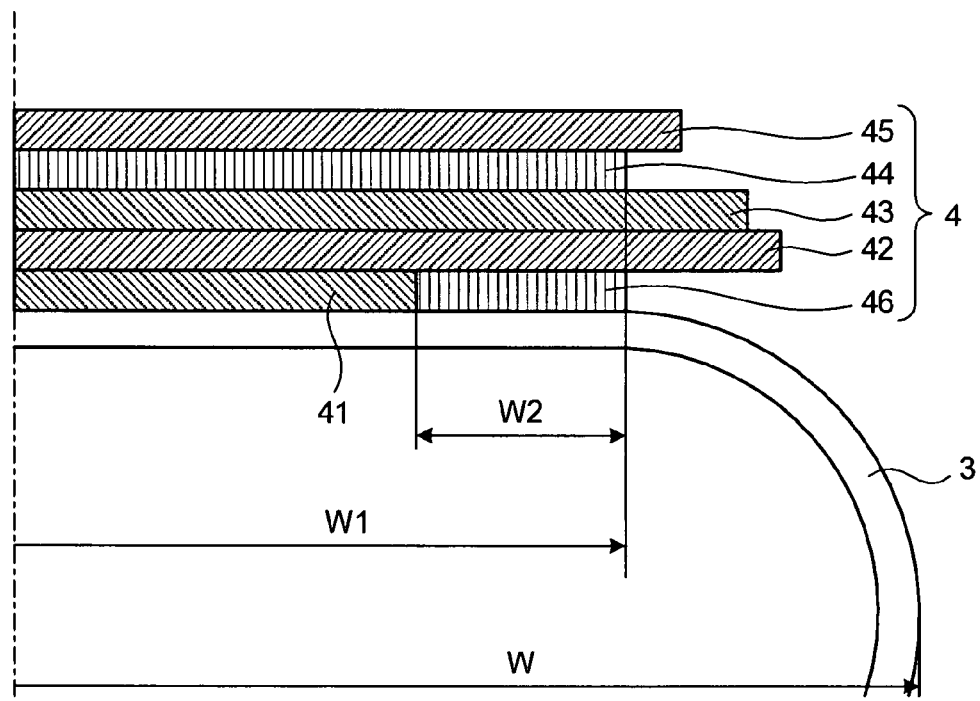
FIG. 3 is an explanatory view of a modified example of the pneumatic tire shown in FIG. 1.

FIG. 1 is a cross section a pneumatic tire in a tire meridian direction according to an embodiment of the present invention. FIG. 2 is an explanatory view of a belt structure of the pneumatic tire shown in FIG. 1. FIG. 3 is an explanatory view of a modified example of the pneumatic tire shown in FIG. 1. FIGS. 4 to 11 are tables each containing results of performance tests of pneumatic tires.

A pneumatic tire 1 includes bead cores (not shown), a carcass layer 3, a belt layer 4, tread rubber 5, and side wall rubbers 6 (see FIG. 1). A bead core is provided on the left and the right. The carcass layer 3 extends between the left and right bead cores, and it has a toroidal shape. The belt layer 4 is formed of a plurality of belt members of 41 to 46 that are superposed, and is arranged on a tire-radial direction outer side with respect to the carcass layer 3. The tread rubber 5 is arranged on the tire-radial direction outer side with respect to both the carcass layer 3 and the belt layer 4, and constitutes a tread of the pneumatic tire 1. Each of the side wall rubbers 6 is arranged on a tire-width direction outer side with respect to the carcass layer 3 and constitutes a side wall of the pneumatic tire 1.

The belt layer 4 includes a high-angle belt 41, a pair of a cross belts 42 and 43, a first circumferential-direction reinforcing layer 44, a protection belt 45, a second circumferential-direction reinforcing layer 46, all of which are superposed in the tire radial direction (see FIG. 2). Each of the members from 41 to 46 has a structure in which, for example, one cord member or a plurality of cord members is arranged in a calendared shape, and is arranged such that a fiber direction (rigidity direction) is oblique to the tire circumferential direction at a certain angle.

The cord member of the high-angle belt 41 has a fiber direction oblique to the tire circumferential direction at an angle not smaller than 45 degrees and not larger than 90 degrees. The high-angle belt 41 is arranged in the tire-radial direction outer side with respect to the carcass layer 3.

One of the cord members of the cross belts 42 and 43 is oblique to the tire circumferential direction in a direction different from that of the cord member of the other of the cross belts 42 and 43. For example, the cord members of the cross belts 42 and 43 are oblique to the tire circumferential direction at an angle not less than 10 degrees and not more than 45 degrees in directions different from each other. The cross belts 42 and 43 are arranged on the tire-radial direction outer side with respect to the high-angle belt 41. In the following description, the cross belt 42 positioned on the tire-radial direction inner side is referred to as "inner-side cross belt 42", and the cross belt 43 positioned on the tire-radial direction outer side is referred to as "outer-side cross belt 43".

The cord member of first circumferential-direction reinforcing layer 44 has a fiber direction oblique to the tire circumferential direction at approximately 0 degrees (for example, 5 degrees or smaller). The first circumferential-direction reinforcing layer 44 has the belt width W1 narrower than those of the cross belts 42 and 43. In other words, the first circumferential-direction reinforcing layer 44 is arranged such that the two edges thereof are on a tire-width direction inner side with respect to the two edges of each of the cross belts 42 and 43. In addition, the first circumferential-direction reinforcing layer 44 is arranged at least on the tire-radial direction outer side with respect to the inner-side cross belt 42. In the embodiment, the first circumferential-direction reinforcing layer 44 is arranged between the inner-side cross belt 42 and the outer-side cross belt 43.

The protection belt 45 is arranged on the tire-radial direction outer side with respect to the cross belts 42 and 43 (the outer-side cross belt 43).

The cord member of the second circumferential-direction reinforcing layer 46 has a fiber angle oblique to the tire circumferential direction at approximately 0 degrees (for example, 20 degrees or smaller). The second circumferential-direction reinforcing layer 46 has a split shape (divided into two parts in the tire width direction). The second circumferential-direction reinforcing layer 46 is arranged between the carcass layer 3 and the inner-side cross belt 42 and on a tire-width direction outer side with respect to the high-angle belt 41. Hence, the second circumferential-direction reinforcing layer 46 reinforces an edge (each of the two edges) of the carcass layer 3 in the tire width direction and its vicinity. Each of the edges of the second circumferential-direction reinforcing layer 46 on the tire-width direction outer side and a corresponding one of the edges of the first circumferential-direction reinforcing layer 44 on the tire-width direction outer side are at approximately in the same position in the tire width direction (for example, the edge of the first circumferential-direction reinforcing layer 44 is in a position from the edge of the second circumferential-direction reinforcing layer 46 within a range smaller than 10 mm).

[Functions and Effects]

In the pneumatic tire 1, (1) the belt layer 4 is reinforced by the first circumferential-direction reinforcing layer 44 and the second circumferential-direction reinforcing layer 46. This leads to an advantage that the anti-wear-breakage performance of the circumferential-direction reinforcing layers improves compared to the case where a belt layer is reinforced by only a first circumferential-direction reinforcing layer. (2) The second circumferential-direction reinforcing layer 46 is arranged so as to be interposed between the carcass layer 3 and the inner-side cross belt (the cross belt positioned on the tire-radial direction inner side) 42. Hence, compared to the structure (see Patent Document 1) in which a second circumferential-direction reinforcing layer is the outermost layer of a belt layer (the outermost layer in the tire radial direction), the movement of the second circumferential-direction reinforcing layer 46 in the tire width direction is reduced during the contact of the tire with the road surface. Accordingly, the separation near the second circumferential-direction reinforcing layer 46 is reduced. Such reduction leads to an advantage that the anti-belt-edge-separation performance of the tire improves. Especially, (3) the edge of the first circumferential-direction reinforcing layer 44 on the tire-width direction outer side and the edge of the second circumferential-direction reinforcing layer 46 on the tire-width direction outer side are at approximately in the same position in the tire width direction (for example, the edge of the first circumferential-direction reinforcing layer 44 is in a position from the edge of the second circumferential-direction reinforcing layer 46 within a range smaller than 10 mm). Hence, a traction applied to the edge of the first circumferential-direction reinforcing layer 44 is dispersed during the contact of the tire with the road surface because of the second circumferential-direction reinforcing layer 46. Such dispersion of traction effectively suppresses the wear and breakage of the edge of the first circumferential-direction reinforcing layer 44, thereby leading to an advantage that the anti-wear-breakage performance of the first circumferential-direction reinforcing layer 44 improves. (4) The first circumferential-direction reinforcing layer 44 is arranged so as to be interposed between the cross belts 42 and 43. Hence, the movement of the first circumferential-direction reinforcing layer 44 is constrained during the contact of the tire with the road surface because of the cross belts 42 and 43. Such constraint of movement inhibits separation near the first circumferential-direction reinforcing layer 44, thereby leading to an advantage that the anti-belt-edge-separation performance of the tire further improves.

In the pneumatic tire 1, the second circumferential-direction reinforcing layer 46 is arranged between the carcass layer 3 and the inner-side cross belt 42 and on the tire-width direction outer side with respect to the high-angle belt 41 (at the same surface level) (see FIGS. 2 and 3). In addition, the second circumferential-direction reinforcing layer 46 has the split shape and is arranged such that the high-angle belt 41 is sandwiched in the tire width direction. Each of the second circumferential-direction reinforcing layers 46, 46 are arranged so as to correspond respectively to the two edges of the first circumferential-direction reinforcing layer 44. The second circumferential-direction reinforcing layer 46 additionally and effectively reinforces the edge of the first circumferential-direction reinforcing layer 44. In this structure, the second circumferential-direction reinforcing layers 46 is additionally arranged so as to correspond to only the edge of the first circumferential-direction reinforcing layer 44. This leads to an advantage that the weight of the tire is reduced compared to the case where a large second circumferential-direction reinforcing layer is arranged (not shown).

First Modified Example

In the pneumatic tire 1, the first circumferential-direction reinforcing layer 44 is arranged so as to be interposed between the cross belts 42 and 43. However, the arrangement of the first circumferential-direction reinforcing layer 44 is not limited to this arrangement. The first circumferential-direction reinforcing layer 44 can be arranged so as to be interposed between the outer-side cross belt 43 and the protection belt 45 (see FIG. 3). With such a structure, the above functions and effects of (1) to (3) are obtained. Because the movement of the first circumferential-direction reinforcing layer 44 is constrained because of the protection belt 45, the separation near the first circumferential-direction reinforcing layer 44 is suppressed. Such suppression of separation leads to an advantage that the anti-belt-edge-separation performance of the tire improves.

In the above structure, it is preferable that the cord member of the protection belt 45 be oblique in a direction different from a direction in which the cord member of the outer-side cross belt 43 is oblique. In other words, attachment of the protection belt 45 is performed such that the fiber direction of the protection belt 45 is oblique in a direction different from the direction in which the cord member of the outer-side cross belt 43 is oblique. In such a structures the movement of the first circumferential-direction reinforcing layer 44 in the tire width direction is effectively reduced because of the protection belt 45. Hence, the separation near the first circumferential-direction reinforcing layer 44 is suppressed. Such suppression of separation leads to an advantage that the anti-belt-edge-separation performance of the tire improves.

Second Modified Example

In the pneumatic tire 1, it is preferable that each cord member of each of the cross belts 42 and 43 has a fiber direction oblique to the tire circumferential direction at an angle of 25 degrees or smaller. Such an angle leads to an advantage that the tire radial growth is effectively suppressed during application of a load due to internal pressure.

It is preferable that the cord member of the high-angle belt 41 has a fiber direction oblique to the tire circumferential direction at an angle of 60 degrees or larger. Especially, if the cords of the cross belts 42 and 43 have fiber directions oblique to the tire circumferential direction at small angles (for example, 25 degrees or smaller), the rigidity to the tire circumferential direction in the tire cross-sectional direction is low. Hence, the anti-wear-breakage performance and shock resistance of the carcass layer 3 may deteriorate. For this reason, the high-angle belt 41 having the above structure leads to an advantage that the wear and breakage of the carcass layer 3, or the like, are suppressed.

Third Modified Example

In the pneumatic tire 1, the edge of the second circumferential-direction reinforcing layer 46 on the tire-width direction outer side and the edge of the first circumferential-direction reinforcing layer 44 on the tire-width direction outer side are at approximately in the same position in the tire width direction. Specifically, it is preferable that the edges be positioned such that the edge of the first circumferential-direction reinforcing layer 44 is in a position from the edge of the second circumferential-direction reinforcing layer 46 within a range smaller than 10 mm. Accordingly, the traction applied to the edge of the first circumferential-direction reinforcing layer 44 is effectively dispersed during the contact of the tire with the road surface because of the second circumferential-direction reinforcing layer 46. Such effective dispersion of traction leads to an advantage that the anti-wear-breakage performance of the first circumferential-direction reinforcing layer 44 effectively improves more.

Fourth Modified Example

In the pneumatic tire 1, it is preferable that the cord member of the first circumferential-direction reinforcing layer 44 have the fiber direction oblique to the tire circumferential direction at an angle of 5 degrees or smaller, and that the cord member of the second circumferential-direction reinforcing layer 46 have the fiber direction oblique to the tire circumferential direction at an angle of 20 degrees or smaller (more preferably, 5 degrees or smaller). Such angles enhance the fastening effect from the circumferential-direction reinforcing layers 44 and 46. The enhancement of the fastening effect leads to an advantage that the tire radial growth is effectively suppressed.

It is preferable that the first circumferential-direction reinforcing layer 44 and the second circumferential-direction reinforcing layer 46 be made of elastic steel cords. However, the first circumferential-direction reinforcing layer 44 and the second circumferential-direction reinforcing layer 46 are not limited to this and can be made of organic fibers, or the like.

Fifth Modified Example

It is preferable in the pneumatic tire 1 that, in its cross section in the tire meridian direction, the cross sectional width W of the carcass layer 3 and the cross sectional width W1 of the first circumferential-direction reinforcing layer 44 satisfy $0.60 \leq W1/W \leq 0.75$ (see FIGS. 2 and 3). Such a relationship leads to an advantage that the tire radial growth is effectively suppressed. For example, when $W1/W < 0.60$ is satisfied, the radial growth of tire shoulders is not suppressed and the belt edge separation tends to occur. When $0.75 < W1/W$ is satisfied, a large load is applied to the edge of the first circumferential-direction reinforcing layer 44, and thus, wear and breakage of wires tend to occur.

Sixth Modified Example

It is preferable in the pneumatic tire 1 that, in its cross section in the tire meridian direction, the cross sectional width W of the carcass layer 3 and the cross sectional width W2 of the second circumferential-direction reinforcing layer 46 satisfies $0.10 \leq W2/W \leq 0.20$. With such a relationship, the traction applied to the edge of the first circumferential-direction reinforcing layer 44 is effectively dispersed, during the contact of the tire with the road surface, because of the second circumferential-direction reinforcing layer 46. Such dispersion of traction leads to an advantage that the anti-wear-breakage performance of the first-circumferential-direction reinforcing layer 44 more effectively improves. For example, when W2/W<0.10 is satisfied, the traction applied to the edge of the first circumferential-direction reinforcing layer 44 is not effectively dispersed. When 0.20<W2/W is satisfied, the function of the high-angle belt may be lowered and the wear and breakage of the carcass layer 3 may occur.

Seventh Modified Example

It is preferable that the pneumatic tire be applied for a heavy-duty pneumatic tire having an aspect ratio of 60% or smaller. The heavy-duty pneumatic tire having such an aspect ratio has a large load ratio of belt inner pressure. For this reason, application of the structure of the above pneumatic tire 1 to the heavy-duty pneumatic tire leads to an advantage that more significant effects are obtained.

[Performance Tests]

In the embodiment, indoor drum-resistance tests were carried out on a plurality of various types of pneumatic tires under different conditions (see FIGS. 4 to 11). In each performance test, a pneumatic tire in a tire size of 435/45R22.5 164J is mounted on a rim in a rim size of 22.5×14.00 and an air pressure of 900 kPa and a load of 68.65 kN are applied to the pneumatic tire. By use of a drum testing machine, tests are performed with a traveling condition of a speed of 45 km/h. Travel distance until the tire breaks is measured. Thereafter, the broken tire is disassembled and remaining breakage resistances of the circumferential-direction reinforcing layers and the carcass layer are measured.

In a conventional example of a pneumatic tire, second circumferential-direction reinforcing layers are arranged above an outer-side cross belt and on tire-width direction outer sides with respect to the edges of a protection belt. On the other hand, in the pneumatic tire 1 of invention examples 1 to 22, the second circumferential-direction reinforcing layers 46 is arranged between the carcass layer 3 and the inner-side cross belt 42 and on the tire-width direction outer side with respect to the edge of the high-angle belt 41 (see FIGS. 1 to 3). Note that the cross sectional width W of the carcass layer 3 is W=426 millimeter in each of the tires. Evaluations are indicated by index evaluation, using conventional examples as standards (100). Larger values of the evaluation results represent preferable evaluation results. Note that, in the tables, the unit of values indicating angles of the belt members of 41 to 46 is degrees, and the unit of values indicating widths is mm.

As indicated in the test results, it is understood that, with the appropriate arrangement of the second circumferential-direction reinforcing layer 46, the remaining breakage resistance of the edge of the second circumferential-direction reinforcing layer 46 and the anti-separation performance of the tire improves (FIG. 4). It is understood that the anti-separation performance of the tire improves by making appropriate the angles at which the fiber directions of the cords of the cross belts 42 and 43 are oblique to the tire circumferential direction (see FIG. 5).

It is understood that the remaining breakage resistance of the edge of the second circumferential-direction reinforcing layer 46 and the anti-separation performance of the tire improve by making appropriate the angle at which the fiber direction of the cord of the high-angle belt 41 is oblique to the tire circumferential direction (FIG. 6). It is understood that the remaining breakage resistance of the edge of the second circumferential-direction reinforcing layer 46 and the anti-separation performance of the tire improve by employing the structure in which the cord member of the protection belt 45 has the fiber direction oblique in a direction different from a direction in which the cord member of the outer cross belt 43 is oblique (see FIG. 7).

It is understood that the remaining breakage resistance of the edge of the second circumferential-direction reinforcing layer 46 and the anti-separation performance of the tire improve by making appropriate the distance in the tire width direction between the edge of the second circumferential-direction reinforcing layer 46 on the tire-width direction outer side and the edge of the first circumferential-direction reinforcing layer 44 on the tire-width direction outer side (see FIG. 8). It is understood that the remaining breakage resistance of the edge of the second circumferential-direction reinforcing layer 46 and the anti-separation performance of the tire improve by making appropriate the angle at which the fiber direction of the cord member of the second circumferential-direction reinforcing layer 46 is oblique to the tire circumferential direction.

It is understood that the remaining breakage resistance of the edge of the second circumferential-direction reinforcing layer 46 and the anti-separation performance of the tire improve by making appropriate the cross-sectional width W1 of the first circumferential-direction reinforcing layer 44 (see FIG. 10). In addition, it is understood that the remaining breakage resistance of the edge of the second circumferential-direction reinforcing layer 46 and the anti-separation performance of the tire improve by making appropriate the cross-sectional width W2 of the second circumferential-direction reinforcing layer 46 (see FIG. 11).

INDUSTRIAL APPLICABILITY

As described above, the pneumatic tire according to the present invention is advantageous in a point that the tire radial growth is suppressed and the anti-belt-edge-separation performance improves.

The invention claimed is:

1. A pneumatic tire including a carcass layer that extends across a pair of left and right bead cores in a toroidal shape, and a belt layer that is arranged on a tire-radial direction outer side with respect to the carcass layer, wherein the belt layer includes a plurality of belt members that are superposed, the belt members including a high-angle belt that is arranged on the tire-radial direction outer side with respect to the carcass layer and extending continuously across a center of the tire in a tire-width direction, a cord member of the high-angle belt having a fiber direction oblique to a tire circumferential direction at an angle not smaller than 45 degrees and not larger than 90 degrees, a pair of cross belts that is arranged on the tire-radial direction outer side with respect to the high-angle belt, a cord member of each of the cross belts having a fiber direction oblique to the tire circumferential direction at an angle not smaller than 10 degrees and not larger than 45 degrees, and the fiber direction of one of the cord members being different from that of other, a first circumferential-direction reinforcing layer that is arranged between the cross belts, and that has two edges on a tire-width direction inner side with respect to two edges of the cross belt on a tire-radial direction inner side and two edges of the cross belt on the tire-radial direction outer side, and a second circumferential-direction reinforcing layer that is arranged between the carcass layer and the cross belt on the tire-radial direction inner side, and on a tire-width direction outer side with respect to two opposite edges of the high-angle belt, and an edge of the first circumferential-direction reinforcing layer on the tire-width direction outer side and an edge of the second circumferential-direction reinforcing layer on the tire-width direction outer side are at approximately in same position in the tire width direction.

2. The pneumatic tire according to claim 1, wherein each of the cord members of the cross belts has the fiber direction oblique to the tire circumferential direction at an angle of 25 degrees or smaller.

3. The pneumatic tire according to claim 1, wherein the cord member of the high-angle belt has the fiber direction oblique to the tire circumferential direction at an angle of 60 degrees or larger.

4. The pneumatic tire according to claim 1, wherein the edges of the second circumferential-direction reinforcing layer on the tire-width direction outer side and the edges of the first circumferential-direction reinforcing layer in the tire-width direction outer side are positioned such that the edge of the first circumferential-direction reinforcing layer is in a position from the edge of the second circumferential-direction reinforcing layer within a range smaller than 10 millimeter in the tire width direction.

5. The pneumatic tire according to claim 1, wherein
the cord member of the first circumferential-direction reinforcing layer has the fiber direction oblique to the tire circumferential direction at an angle of 5 degrees or smaller, and
the cord member of the second circumferential-direction reinforcing layer has the fiber direction oblique to the tire circumferential direction at an angle of 20 degrees or smaller.

6. The pneumatic tire according to claim 1, wherein a cross-sectional width W of the carcass layer and a cross-sectional width W1 of the first circumferential-direction reinforcing layer in a cross section of the pneumatic tires in a tire meridian direction satisfy $0.60 \leq W1/W \leq 0.75$.

7. The pneumatic tire according to claim 1, wherein a cross-sectional width W of the carcass layer and a cross-sectional width W2 of the second circumferential-direction reinforcing layer in the cross section of the pneumatic tires in the tire meridian direction satisfy $0.10 \leq W2/W \leq 0.20$.

8. The pneumatic tire according to claim 1, wherein the pneumatic tire is applied to a heavy-duty pneumatic tire having a tire aspect ratio of 60% or smaller.

9. A pneumatic tire including a carcass layer that extends across a pair of left and right bead cores in a toroidal shape, and a belt layer that is arranged on a tire-radial direction outer side with respect to the carcass layer, wherein
the belt layer includes a plurality of belt members that are superposed, the belt members including
a high-angle belt that is arranged on the tire-radial direction outer side with respect to the carcass layer and extending continuously across a center of the tire in a tire-width direction, a cord member of the high-angle belt having a fiber direction oblique to a tire circumferential direction at an angle not smaller than 45 degrees and not larger than 90 degrees,
a pair of cross belts that is arranged on the tire-radial direction outer side with respect to the high-angle belt, a cord member of each of the cross belts having a fiber direction oblique to the tire circumferential direction at an angle not smaller than 10 degrees and not larger than 45 degrees, and the fiber direction of one of the cord members being different from that of other,
a first circumferential-direction reinforcing layer that is arranged on the tire-radial direction outer side with respect to the cross belts, and that has two edges on a tire-width direction inner side with respect to two edges of the cross belt on a tire-radial direction inner side and two edges of the cross belt on the tire-radial direction outer side,
a protection belt that is arranged on the tire-radial direction outer side with respect to the first circumferential-direction reinforcing layer, and
a second circumferential-direction reinforcing layer that is arranged between the carcass layer and the cross belt on the tire-radial direction inner side, and on a tire-width direction outer side with respect to two opposite edges of the high-angle belt, and
an edge of the first circumferential-direction reinforcing layer on a tire-width direction outer side and an edge of the second circumferential-direction reinforcing layer on the tire-width direction outer side are at approximately in same position in the tire width direction.

10. The pneumatic tire according to claim 9, wherein the cord member of the protection belt has the fiber direction oblique to a direction different from a direction in which the fiber direction of the cord member of the cross belt on the tire-radial direction outer side is oblique.

11. The pneumatic tire according to claim 9, wherein each of the cord members of the cross belts has the fiber direction oblique to the tire circumferential direction at an angle of 25 degrees or smaller.

12. The pneumatic tire according to claim 9, wherein the cord member of the high-angle belt has the fiber direction oblique to the tire circumferential direction at an angle of 60 degrees or larger.

13. The pneumatic tire according to claim 9, wherein the edges of the second circumferential-direction reinforcing layer on the tire-width direction outer side and the edges of the first circumferential-direction reinforcing layer in the tire-width direction outer side are positioned such that the edge of the first circumferential-direction reinforcing layer is in a position from the edge of the second circumferential-direction reinforcing layer within a range smaller than 10 millimeter in the tire width direction.

14. The pneumatic tire according to claim 9, wherein
the cord member of the first circumferential-direction reinforcing layer has the fiber direction oblique to the tire circumferential direction at an angle of 5 degrees or smaller, and
the cord member of the second circumferential-direction reinforcing layer has the fiber direction oblique to the tire circumferential direction at an angle of 20 degrees or smaller.

15. The pneumatic tire according to claim 9, wherein a cross-sectional width W of the carcass layer and a cross-sectional width W1 of the first circumferential-direction reinforcing layer in a cross section of the pneumatic tires in a tire meridian direction satisfy $0.60 \leq W1/W \leq 0.75$.

16. The pneumatic tire according to claim 9, wherein a cross-sectional width W of the carcass layer and a cross-sectional width W2 of the second circumferential-direction reinforcing layer in the cross section of the pneumatic tires in the tire meridian direction satisfy $0.10 \leq W2/W \leq 0.20$.

17. The pneumatic tire according to claim 9, wherein the pneumatic tire is applied to a heavy-duty pneumatic tire having a tire aspect ratio of 60% or smaller.

* * * * *